April 21, 1953
R. J. THORPE ET AL
2,635,425
DUAL FLOW FUEL NOZZLE SYSTEM HAVING MEANS TO
INJECT AIR IN RESPONSE TO LOW FUEL PRESSURE
Filed Sept. 7, 1949
2 SHEETS—SHEET 1
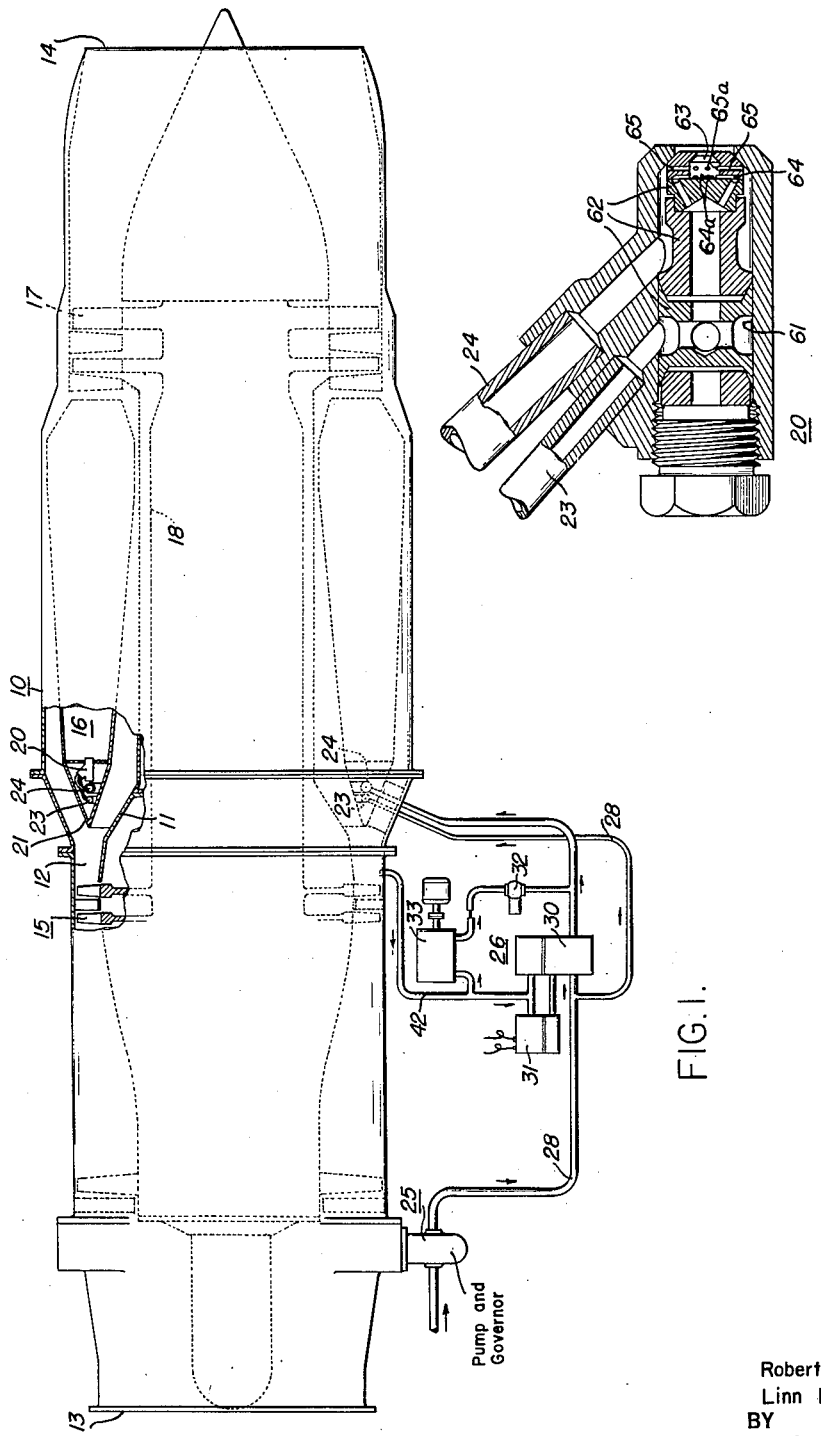
INVENTORS
Robert J. Thorpe
Linn F. Cummings
BY
ATTORNEY

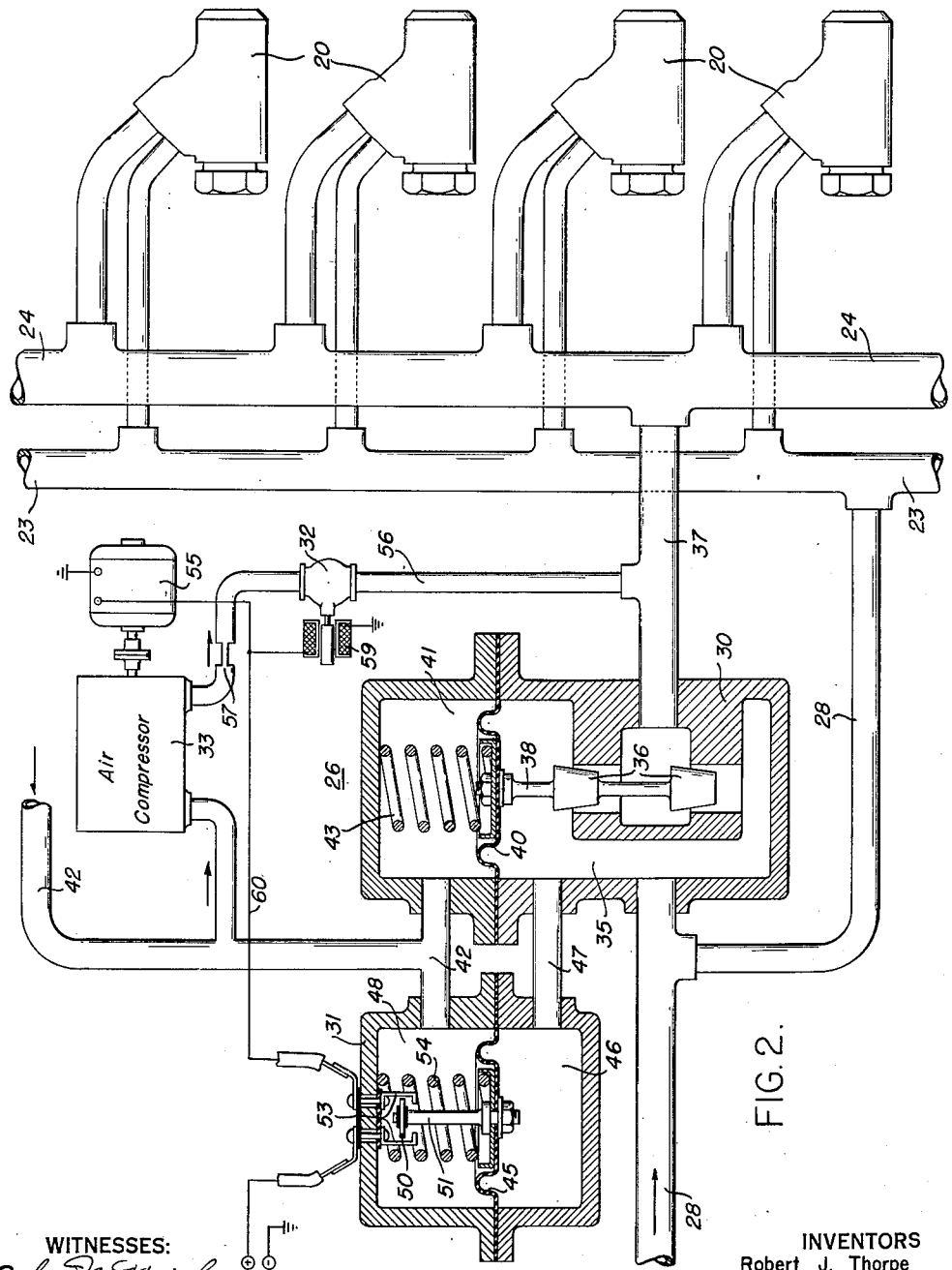

Patented Apr. 21, 1953

2,635,425

UNITED STATES PATENT OFFICE 2,635,425

DUAL FLOW FUEL NOZZLE SYSTEM HAVING MEANS TO INJECT AIR IN RESPONSE TO LOW FUEL PRESSURE

Robert J. Thorpe, Ridley Park, and Linn F. Cummings, Media, Pa., assignors to Westinghouse Electric Corporation, East Pittsburgh, Pa., a corporation of Pennsylvania Application September 7, 1949, Serial No. 114,354

9 Claims. (Cl. 60—39.27)

1

This invention relates to aircraft gas turbine power plants, particularly to fuel supply apparatus therefor, and has for an object the provision of improved fuel atomization means for an aviation gas turbine engine.

In order to fulfill fuel requirements of an aviation gas turbine power plant when operating at altitudes exceeding 60,000 feet, it is necessary to overcome the adverse effects of low pressure and rate of flow of fuel for ensuring fully atomized fuel to all areas of the combustion apparatus. It will be understood that the fuel requirement of such a power plant at sea level will greatly exceed that under high altitude conditions, so that a fuel system must be provided which can be operated to deliver fuel over a wide range in rates of flow. The range of a fuel system may be defined as the ratio of its minimum fuel flow requirements to its maximum fuel flow requirements. Since the maximum available pressure of a fuel system is in practice limited, it has been proposed to employ dual-flow nozzles, each having two sets of fixed area swirl slots with a common discharge orifice, to effect fuel supply over a range in flow rates of adequate extent. These nozzles may provide both small and large sets of swirl slots with a common discharge orifice, the swirl slots being adapted to be independently supplied with fuel, for metering fuel in accordance with varying operational demands of the power plant. In operation, the nozzles are arranged to supply fuel by way of both sets of swirl slots when fuel demand is high, and to meter fuel only through the smaller set of swirl slots when the fuel requirement of the engine is low.

At high altitudes, however, when fuel is caused to dribble through the smaller or primary swirl slots at a low rate of flow, problems arising from the limited pressure head and effusion of air from the fuel may render desirable the provision of auxiliary means for facilitating adequate atomization of the low velocity fuel, so that efficient combustion can be maintained. It is, therefore, an object of this invention to provide improved fuel control means to achieve this result.

Another object of the invention is the provision of means for utilizing the otherwise idle secondary fuel supply communication of a dual-flow fuel nozzle system of the aforementioned type for introducing air under pressure which serves to facilitate atomization of the fuel being supplied to combustion apparatus by way of the primary fuel supply communication, during service operation under high altitude conditions calling for a low rate of fuel flow.

2

A further object is the provision of nozzle means selectively operative at one time to supply fuel to a turbojet engine at a predetermined high rate, and at another time to supply fuel at a low rate together with air under pressure.

Still another object is the provision of control apparatus for such a fuel system.

These and other objects are effected by the invention as will be apparent from the following description and claims taken in connection with the accompanying drawings, forming a part of this application, in which:

Fig. 1 is a schematic view of a gas turbine power plant having a fuel system constructed in accordance with the invention;

Fig. 2 is a diagrammatic sectional view of the essential elements of the fuel system shown in Fig. 1; and Fig. 3 is an enlarged detail sectional view of one of the dual-flow nozzles shown in Fig. 2.

Referring to Fig. 1 of the drawings, the typical aviation gas turbine or turbojet engine therein disclosed comprises an outer substantially cylindrical casing structure 10, an interiorly disposed sectional core structure generally indicated at 11, forming an annular flow passage 12 extending from a frontal air inlet opening 13 to a rearwardly directed nozzle 14, and operating elements aligned therein and including an axial-flow compressor 15, combustion apparatus 16, and a turbine 17 connected to the compressor by a common shaft 18. The general principles of operation of such a power plant are well known, and may be briefly summarized as follows: Air entering the inlet opening 13 is delivered under pressure from the compressor 15 to the combustion apparatus 16 for supporting combustion of fuel supplied thereto as hereinafter explained, and the heated motive gases thus provided are then expanded through the turbine 17 and are finally discharged to atmosphere by way of the nozzle 14, establishing a propulsive thrust.

For supplying fuel to the combustion apparatus 16 there are provided a plurality of dual-flow nozzles 20, which may be mounted in a fairing structure 21 suitably carried in passage 12 adjacent the upstream end of the combustion apparatus. A pair of fuel manifolds, which may be designated primary and secondary manifolds 23 and 24, respectively, are provided for supplying fuel to the nozzles at rates determined by operation of an associated control system which includes a pump and governor apparatus 25, and selector control apparatus indicated generally at 26.

The pump and governor apparatus 25 may be of any suitable construction, and is responsive to manual operation or to automatic indications of operating conditions such as engine speed, temperature and altitude, for varying the rate of supply of fuel under pressure to a fuel input pipe 28, one branch of which communicates directly with the primary manifold 23, and another branch of which leads to the selector control apparatus 26.

As best shown in Fig. 2, the selector control apparatus 26 constructed in accordance with the invention may comprise a splitter valve device 30, a fluid pressure responsive switch 31, an electro-responsive air valve device 32, and an auxiliary or booster air compressor 33. The splitter valve device 30 comprises a casing having a valve chamber 35, which communicates with the fuel input pipe 28 and contains a double or balanced type valve element 36 adapted for controlling communication between the valve chamber and a pipe 37 leading to the secondary manifold 24. The valve element 36 has a stem 38 which is secured to a flexible diaphragm 40 that is interposed between the valve chamber 35 and a chamber 41 communicating by way of a pipe 42 with the passage 12 adjacent the discharge outlet of the compressor 15 in the engine (see Fig. 1). A biasing spring 43 is interposed between the diaphragm 40 and the end wall of the chamber 41 for urging the valve element 36 toward its seated position.

The switch device 31 comprises a casing in which is mounted a flexible diaphragm 45 having formed on one side a chamber 46 which is open to the valve chamber 35 through a communication 47, and having on the other side a chamber 48, which communicates with the air supply pipe 42. A movable switch element 50 is provided for operation by the diaphragm 45, and may be supported in chamber 48 on a stem 51 in cooperative relation with a pair of suitably insulated contact elements 53 carried by the casing of the switch device. A spring 54 is interposed between an upper wall of chamber 48 and the diaphragm 45 for urging the switch contact element 50 toward contact with the elements 53.

The booster compressor 33 is adapted to be driven by a motor 55, under conditions hereinafter described, for further compressing air already initially compressed by the engine compressor 15, and for delivering such air under pressure at a controlled rate to the secondary manifold 24 by way of a conduit 56 having a restricted portion 57. The air valve device 32 controls communication through the conduit 56 and comprises a normally closed movable valve element (not shown) operative to open such communication for permitting air to flow to the manifold 24 only upon energization of a magnet 59, which is operatively related with a movable iron core connected to the valve element. Both the motor 55 and the magnet 59 are adapted for energization through a circuit 60, which is controlled by the switch device 31.

Referring to Fig. 3, each of the dual-flow nozzles 20 may comprise a body having a bore 61 and containing a stationary core assembly 62, which is suitably arranged to define a swirl chamber and orifice 63 communicating with the primary manifold 23 through slots 64 terminating in first discharge ports 64a, and with the secondary manifold 24 through slots 65 terminating in second discharge ports 65a. The nozzle is illustrated in schematic form only, it being understood that any suitable nozzle provided with dual orifices may be employed in the fuel system constructed in accordance with the invention.

In operation, when fuel under pressure is supplied at a flow rate above the minimum or dribble rate to the input pipe 28, such fuel flows through the primary manifold 23 and issues from the orifice by way of the primary swirl slots of the respective nozzles 20, at the rate predetermined by functioning of the governor apparatus 25. At the same time, fuel flows from the input pipe 28 into the valve chamber 35 of the splitter valve device 30, imposing pressure on the diaphragm 40. Assuming that the fuel pressure is high enough to overcome the pressure of air in the chamber 41 plus the force of the spring 43, the valve element 36 is thereby held in unseated position for permitting supply of fuel through the pipe 37 and secondary manifold 24 to the secondary swirl slots 65 and orifices 63 of the respective nozzles 20. Pressure of fuel is also effective in the chamber 46 of the switch device 31 to maintain open the circuit 60 controlled by the switch contact elements 50 and 53, so that both the motor 55 and magnet 59 remain deenergized. Under this condition, the booster compressor 33 is inoperative and the air valve 32 is closed, since compressed air is not required to assist in atomizing the fuel when flowing at a rate greater than the minimum rate.

An increase in compressor discharge pressure acting in chamber 41 will be accompanied by a proportionate rise in primary fuel pressure in the valve chamber 35 by reason of the usual operation of the governor apparatus 25 in effecting acceleration of the power plant, or in response to increased loading upon descent from a high altitude to sea level flight. Compensation for this condition is effected, however, inasmuch as the diaphragm 40 is subject to the same compressor discharge pressure as is the diaphragm 45 in the switch device 31. By this means, the differential pressure across these diaphragms remains the same and their position is unaffected.

Let it now be assumed that the power plant is operated under conditions giving rise to an extremely low rate of flow of fuel, as when the load on the engine is decreased during idling operation at high altitude, and that the pressure of fuel acting on the diaphragms 45 and 40 in the respective chambers 35 and 46 is reduced sufficiently to allow the spring 54 to effect contact of the switch elements 50 and 53, while the spring 43 becomes effective to seat the double valve element 36 to shut off further flow of fuel to the pipe 37 and secondary manifold 24. Upon engagement of the switch elements 50 and 53, the circuit 60 is energized from a suitable source of electrical energy to effect operation of the compressor motor 55 and energization of the magnet 59. The air valve device 32 is thereby operated to supply air compressed by the booster compressor 33 through pipes 56 and 37 to the secondary manifold 24, and thence to the secondary swirl slots 65 of the respective nozzles 20. The fuel still issuing at a low rate of flow from the primary swirl slots 64 is thus picked up by the pressurized air flowing from the adjacent secondary orifices, and is thereby expelled in a fine mist from the discharge orifices 63 of nozzles 20 into the combustion apparatus.

From the foregoing, it will be apparent that the improved fuel system constructed in accordance with the invention will in effect combine the advantages inherent in a fixed orifice fuel system with the desirable feature of increased available range, or ratio of minimum fuel flow to maximum fuel flow. The improved control apparatus, operated without the compressed air feature, will provide straight line relation of fuel flow versus pressure, using the two sets of fixed swirl slots of the dual-flow nozzles. With the addition of the compressed air function, the rangeability of the system may be expected to increase to a marked degree, and for example, may rise from a normal range in fuel ratio of 25 to 1 to a range in ratio of 130 to 1, while rendering available fuel of smaller droplet size at a low rate of flow, thus facilitating starting and rendering possible adequately efficient performance of the gas turbine engine at high altitudes.

While the invention has been shown in but one form, it will be obvious to those skilled in the art that it is not so limited, but is susceptible of various changes and modifications without departing from the spirit thereof.

What is claimed is:

1. In a fuel system, a source of liquid fuel under pressure, a primary fuel manifold communicating therewith, a secondary fuel manifold, a conduit connecting said source with said secondary manifold, a fuel nozzle having first and second discharge ports communicating with said primary and secondary manifolds, respectively, a control valve device interposed in said conduit and operative for selectively opening and closing communication from said source of fuel to said secondary fuel manifold, a source of air under pressure, and control apparatus operative upon operation of said control valve device for cutting off supply of fuel to said secondary mainfold to initiate supply of air under pressure thereto from said source of air under pressure.

2. In a fuel system including a source of liquid fuel under pressure, a plurality of dual-flow fuel nozzles having first and second discharge ports, primary and secondary fuel manifolds having supply communications connected to said source and adapted to supply fuel from said source to the respective first and second discharge ports of said nozzles, and a fuel cut-off valve device interposed in the communication between said source and said secondary manifold and responsive to a predetermined reduction in pressure of fuel from said source for closing communication therefrom to said secondary manifold; the combination therewith of air supply means, and a fluid pressure responsive control device responsive to such predetermined reduction in pressure of fuel from said source, effecting the aforesaid closing operation of said fuel cut-off valve device, for effecting operation of said air supply means to supply air under pressure to said secondary fuel manifold.

3. In a fuel system including a source of liquid fuel under pressure, a plurality of dual-flow fuel nozzles having first and second discharge ports, primary and secondary fuel manifolds, conduits connecting said source to said manifolds, said primary and secondary manifolds being adapted to supply fuel from said source to the respective first and second discharge ports of said nozzles, and a fuel cut-off valve device interposed in the conduit connected to said secondary manifold and responsive to a predetermined reduction in pressure of fuel from said source for closing communication therefrom to said secondary manifold, the combination therewith of air supply means, and control means cooperative with said fuel cut-off valve device for effecting operation of said air supply means to supply air under pressure to said secondary fuel manifold when flow of fuel thereto has been stopped.

4. In a fuel system including a source of liquid fuel under pressure, a plurality of dual-flow fuel nozzles having first and second discharge ports, primary and secondary fuel manifolds, conduits connecting said source to said manifolds, said primary and secondary manifolds being adapted to supply fuel from said source to the respective first and second discharge ports of said nozzles, and a fuel cut-off valve device interposed in the conduit connected to said secondary manifold and responsive to a predetermined reduction in pressure of fuel from said source for closing communication therefrom to said secondary manifold, the combination therewith of air supply means, an electric control circuit serving when closed for effecting operation of said air supply means to supply air under pressure to said secondary fuel manifold, and a switch cooperative with said cut-off valve device for closing said circuit when flow of fuel to said secondary fuel manifold has been cut off.

5. Fuel control apparatus including a primary nozzle communication, a secondary nozzle communication, fuel supply means separately connected thereto and operative to effect supply of fuel under pressure to both of said communications, a control valve device interconnected between said fuel supply means and said secondary nozzle communication and responsive to a reduction in fuel pressure to cut off supply of fuel to said secondary nozzle communication, a source of air under pressure, and means jointly operative with said control valve device for effecting supply of air under pressure from said source to said secondary nozzle communication while fuel is being supplied only to said primary nozzle communication.

6. Fuel control apparatus for a gas turbine power plant having a compressor, comprising a primary nozzle communication, a secondary nozzle communication, a source of fuel under pressure having branch conduits for the supply of fuel to both of said nozzle communications, a control valve device interposed in the branch conduit for said secondary nozzle communication and responsive to a reduction in fuel pressure to cut off flow of fuel from said source to said secondary nozzle communication, an air valve device connected to the last-named branch conduit downstream of said control valve device, and a pressure-responsive device operative upon a reduction in fuel pressure to actuate said air valve device to effect supply of air under pressure from said compressor to said secondary nozzle communication.

7. Fuel control apparatus for a gas turbine power plant having a compressor, comprising a primary nozzle communication, a secondary nozzle communication, a source of fuel under pressure for the supply of fuel to both of said nozzle communications, an air valve device controlling communication between said compressor and said secondary nozzle communication, and fluid pressure operative control apparatus responsive to a reduction in pressure of fuel from said source for cutting off flow of fuel therefrom to said secondary nozzle communication and for actuating said air valve device to effect supply of air under pressure from said compressor to said secondary nozzle communication.

8. Fuel control apparatus for a gas turbine power plant having a compressor, comprising a primary nozzle communication, a secondary nozzle communication, a source of fuel under pressure for the supply of fuel to both of said nozzle communications, an air valve device controlling communication between said compressor and said secondary nozzle communication, an auxiliary booster compressor interposed in the communication between the first-named compressor and said air valve device, and fluid pressure operative control apparatus responsive to a reduction in pressure of fuel from said source for cutting off flow of fuel therefrom to said secondary nozzle communication and for effecting operation of said air valve device and said booster compressor to supply air under pressure to said secondary nozzle communication.

9. Fuel control apparatus for a gas turbine power plant having a compressor, comprising a primary nozzle communication, a secondary nozzle communication, a source of fuel under pressure for the supply of fuel to both of said nozzle communications, air supply apparatus including a normally closed air valve operable to effect supply of air compressed by said compressor to said secondary nozzle communication, a fuel valve operable to control flow of fuel under pressure from said source to said secondary nozzle, biasing means, and movable abutment means subject to the opposing pressures of fuel from said source and of said biasing means plus the pressure of air discharged from said compressor, said movable abutment means being responsive to a relative reduction in fuel pressure for effecting operation of said fuel valve to cut off communication between said source of fuel under pressure and said secondary nozzle communication while effecting opening operation of said air valve.

ROBERT J. THORPE.
LINN F. CUMMINGS.

References Cited in the file of this patent

UNITED STATES PATENTS

| Number | Name | Date |
|---|---|---|
| 662,319 | Smith | Nov. 20, 1900 |
| 980,801 | Kraus | Jan. 3, 1911 |
| 1,273,466 | Doble | July 23, 1918 |
| 1,512,132 | Pfahl | Oct. 21, 1924 |
| 2,476,701 | Cochrane | July 19, 1949 |